J. Addison Davis,
Corn-Planter.
Patented Jul 12 1870
105316
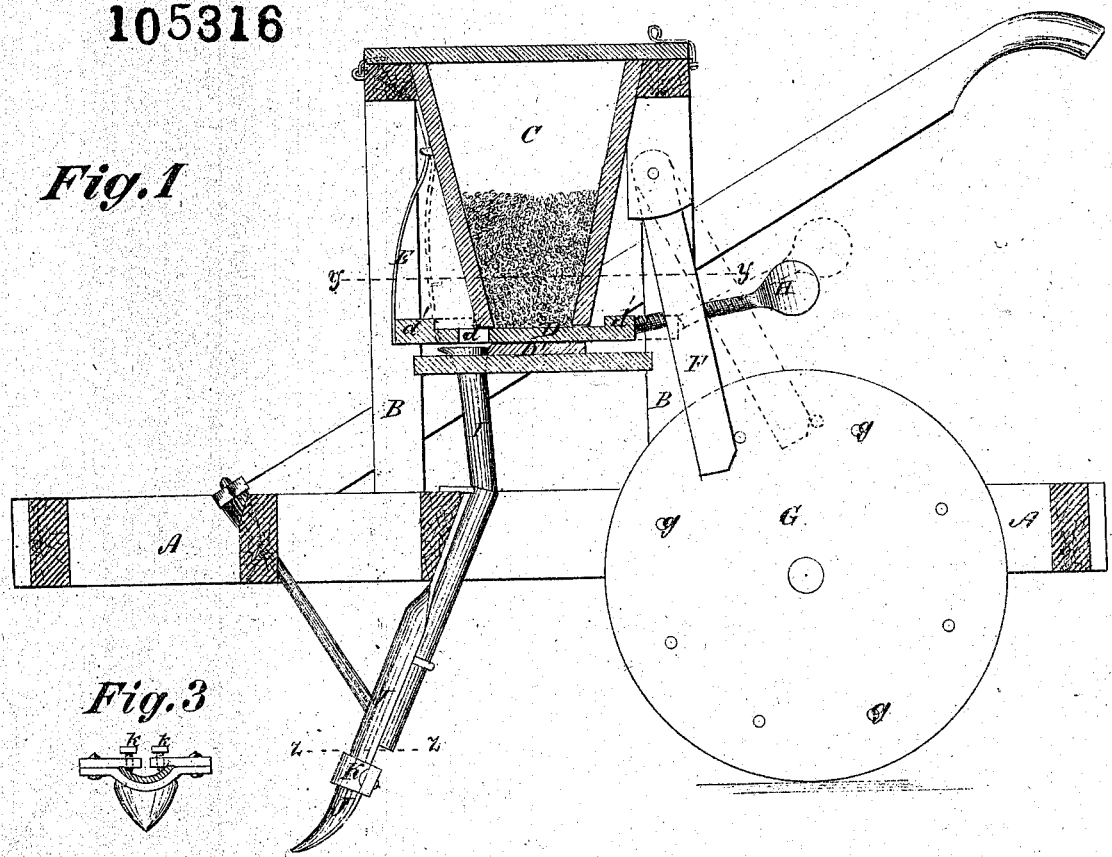
Fig. 1
Fig. 3
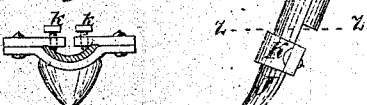
Fig. 2
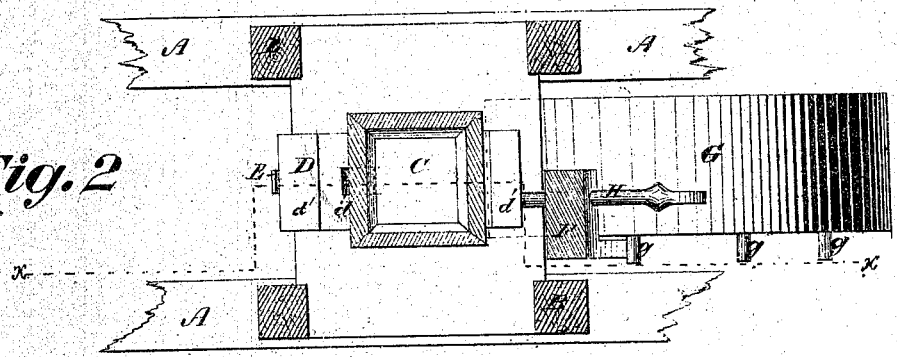
Witnesses
Joe I. Peyton
J. A. Davis
by his Atty
Wm. D. Baldwin

United States Patent Office.

J. ADDISON DAVIS, OF VERONA, MISSISSIPPI.

Letters Patent No. 105,316, dated July 12, 1870.

---

IMPROVEMENT IN CORN-PLANTERS.

---

The Schedule referred to in these Letters Patent and making part of the same.

---

To all whom it may concern:

Be it known that I, J. ADDISON DAVIS, of Verona, in the county of Lee and State of Mississippi, have invented certain new and useful Improvements in Seed-Planters, of which the following is a specification.

My invention relates to a machine of that class which is supported by a single wheel, provided with pins on its face, arranged at any desired distance apart, which pins, as the wheel revolves, operate a lever, imparting the requisite reciprocating movement to a seed-slide, and cause the seed to be dropped at regular intervals, with the deposits at distances apart corresponding with the distances between the pins on the wheel.

The improvements herein claimed consist—

First, in the combination, of a trench-opener, a tube extending from behind the trench-opener to a seed-distributing slide reciprocating at the bottom of a seed-hopper, a spring bearing against the front end of the slide, a lever pivoted in rear of the hopper, having a bearing against the rear of the slide, and a supporting-wheel, provided with pins on its face, to operate the lever, as hereinafter set forth.

Second, in the combination, with a seed-hopper, of a sliding seed-distributer, reciprocating at the bottom of the hopper, a pendulous lever, operated by pin on the wheel which supports the machine, and a screw passing through the lever and bearing upon the slide, as hereinafter set forth.

Third, in the combination of a trench-opener and its shank, a seed-conducting tube attached to the shank, and a scraper, adjustable on the shank, as hereinafter set forth, whereby the trench is opened, and grass and weeds removed before the seed is deposited.

In the accompanying drawing—

Figure 1 represents a side elevation of my machine, partly in section, at the line $x\ x$ of fig. 2.

Figure 2, a horizontal section of the same at the line $y\ y$ of fig. 1; and

Figure 3, a section at the line $z\ z$ of fig. 1.

A represents a stout frame, in this instance, rectangular in form, by the uprights B of which is supported a hopper, C, to contain the corn or other seed to be planted.

Beneath the hopper is a slide, D, having an opening, $d$, near its front end

A plate spring, E, is secured at one end to the front of the hopper, and its other end bears against the forward end of the slide D.

The slide rests upon a removable block, D', supported on the frame, and is provided with shoulders $d'\ d'$ at its ends.

A pendulous rod or lever, F, is pivoted at its upper end in rear of the hopper, and its lower end descends far enough to be struck and pushed forward by pins $g$ on the face of a wheel, G, which supports the machine.

A temper screw, H, passes through this lever, and bears against the rear end of the slide D.

A tube, I, extends from beneath the slide D to the rear of a shovel-plow or trench-opener, J, suitably braced from the frame, and in the same vertical plane as the wheel G.

Upon the shank of the trench-opener is secured a double-scraper, K, for scraping or dressing the surface of the ground, and removing and destroying the weeds and grass. This scraper embraces the shank of the plow, and has wings projecting out from the plow, and may be adjusted at any height desired by sliding it on the plow-shank, and held by means of set-screws, $k$, passing through the rear of the scraper and bearing against the shank, as shown in fig. 3.

The operation of the machine is as follows:

The animal for drawing the machine having been attached to it in any suitable manner, and pins having been secured in the holes in the face of the wheel at distances apart corresponding with the distance it is desired to have intervene between the points at which the seed are dropped, the machine is put in motion, and, as a pin comes in contact with the lower end of the lever, it is swung forward from its normal position, shown in dotted lines, pushing with it the seed-slide, the seed-holding opening in which is brought over the flaring mouth of the conducting tube, into which the seed previously held in the opening $d$ drop and pass down into the trench opened by the plow.

The broad supporting-wheel then passes over the trench, and some of the loose earth at its sides is pushed back in the trench upon the seed and covers them.

When the pin has passed the end of the lever, and allows it to escape, the spring E, bearing against the slide, forces it back until its shoulder strikes the hopper, bringing the opening or seed-cap $d$ within the hopper, and the lever to its former position, when another pin strikes it, and the above-described operation is repeated.

It will be seen that, by turning the screw H, the slide may be forced forward, so that only a portion of the opening $d$ is allowed to enter the hopper, or that, by turning the screw the other way, the opening is brought wholly within the hopper, when the slide is forced back by the spring.

The quantity of seed planted after each forward movement of the slide is thus easily regulated. The slide may be removed when desired by removing the block D'.

I am aware that it is not new to operate the seed-distributing mechanism of a seed-planter by means of pins or cams on a wheel, and do not, therefore, broadly claim a machine so constructed.

What I claim is—

1. The combination of the trench-opener, the conducting-tube, the hopper, the seed-slide, the spring, bearing against the slide, the pendulous lever, the supporting-wheel and its pins, all these parts being constructed to operate substantially as set forth.

2. The combination of the reciprocating seed-slide, the pendulous lever, and the adjusting screw, as set forth.

3. The combination of the trench-opener and its shank, the conducting-tube, and the adjustable scraper, all these parts being constructed to operate as set forth.

J. ADDISON DAVIS.

Witnesses:
A. H. RAYMOND,
J. H. STRAIN.